May 2, 1950     R. H. HUNTER     2,506,152
FLOW REGULATOR
Filed Oct. 21, 1946     2 Sheets-Sheet 1
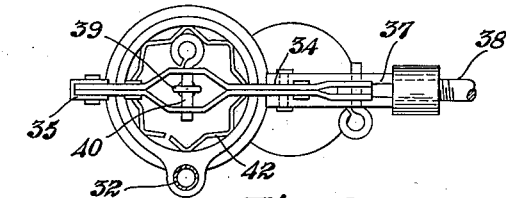
Fig.2
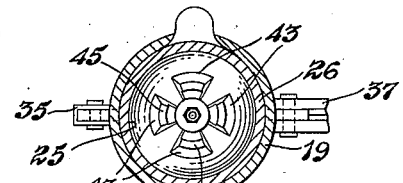
Fig.5
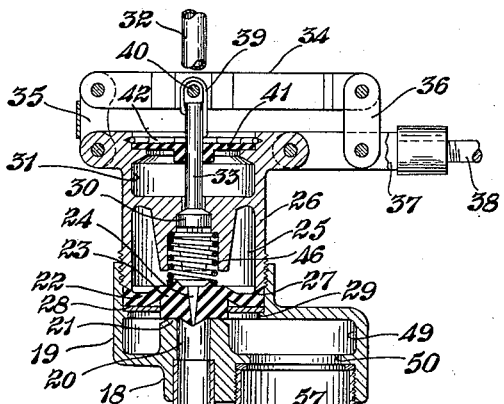
Fig.1
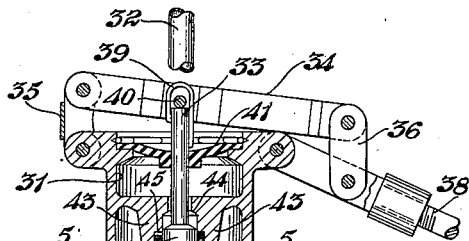
Fig.4
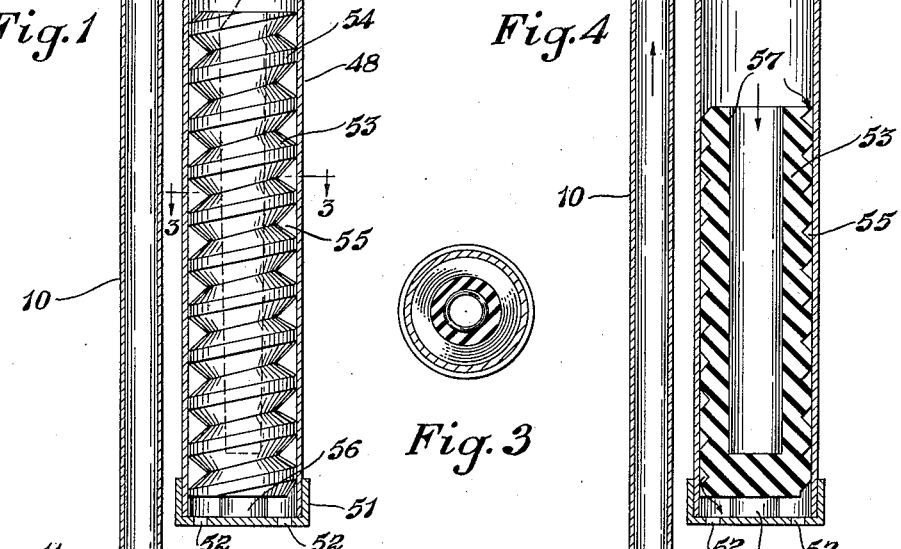
Fig.3
Inventor
Rutherford H. Hunter
By 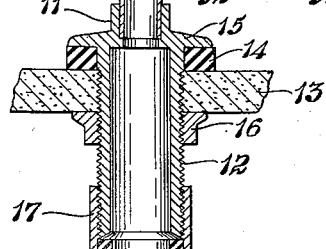
Attorneys

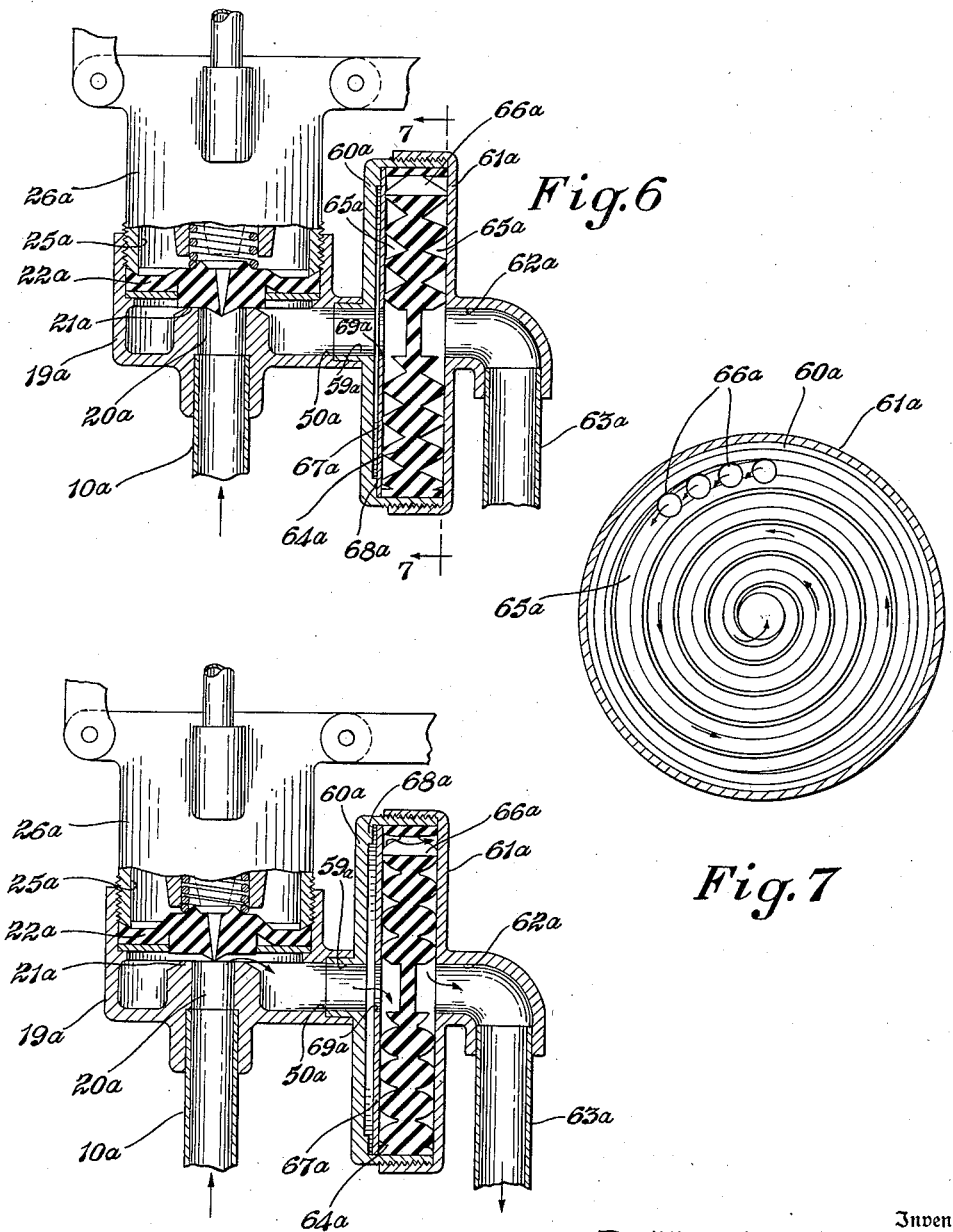

Patented May 2, 1950

2,506,152

UNITED STATES PATENT OFFICE 2,506,152

FLOW REGULATOR

Rutherford H. Hunter, Wooster, Ohio

Application October 21, 1946, Serial No. 704,774

9 Claims. (Cl. 138—43)

The invention relates generally to a device for automatically regulating the flow of fluid through a passageway under varying pressure conditions, and more particularly to a device for regulating the flow of the water supply to a water closet flush tank so as to maintain the flow entering the tank substantially uniform regardless of variations in supply pressure over a wide range.

From a manufacturing standpoint, ball cock or valve assemblies, for controlling the flow of water into water closet flush tanks, are made to have a standard construction for universal use throughout the United States, and throughout most other parts of the world in which they are sold. It is common knowledge that the water supply pressure for domestic use varies greatly between different localities; for example, in one locality it may be as low as 15 pounds per square inch, while in another locality it may be as high as 160 pounds per square inch.

Certain prior ball cock constructions have been noisy due to vibration or water hammer, and attempts have been made to improve the construction of the ball cock so as to produce a substantially quiet operation. However, while such improvements have sometimes produced good results with a certain water supply pressure, under widely different water supply pressures they become very noisy, and in some cases fail entirely to operate.

It is therefore an object of the present invention to provide a flow regulating device which will maintain the flow of fluid through a passageway substantially uniform under varying conditions of supply pressure.

More specifically, it is an object of the present invention to provide a flow regulator for maintaining the flow of water into a water closet flush tank substantially uniform regardless of wide variations in water supply pressure.

A further object is to provide a flow regulator which is adapted for use with various kinds of ball cock or valve assemblies for controlling the flow of water into water closet flush tanks.

A still further object is to provide a novel flow regulating device which is simple and inexpensive to manufacture, and which has no working parts to get out of order and require repair.

Finally, it is an object of the present invention to provide a novel flow regulating device which overcomes the disadvantages of prior flow regulators, and which is adapted to be used with ball cock assemblies for water closet flush tanks, to render the same practicable for universal use with widely different water supply pressures.

These and other objects are accomplished by the parts, constructions, arrangements, combinations and methods which comprise the present invention, the nature of which is set forth in the following general statement, and a preferred embodiment of which is set forth in the following description and illustrated in the accompanying drawings, and which is particularly and distinctly pointed out and set forth in the appended claims forming part hereof.

In general terms, the flow regulating device of the present invention includes a flow regulating chamber connected in the water supply line leading to the flush tank, a resilient flow regulating element within the chamber and abutting said chamber walls, said element having an exterior spiral groove therein forming a spiral passageway adjacent said chamber walls, the inlet to said chamber being arranged to introduce water therein in such manner as to distort said element in proportion to different supply pressures so as to vary the area of the spiral passageway to maintain a substantially constant flow of water therethrough.

Referring to the drawings forming part hereof, in which preferred embodiments of the present invention are shown by way of example;

Figure 1 is a vertical sectional view of a ball cock in closed position, and embodying one form of the novel flow regulator;

Fig. 2 is a plan view thereof;

Fig. 3 is a fragmentary plan sectional view as on line 3—3, Fig. 1;

Fig. 4 is a view similar to Fig. 1 showing the ball cock in open position;

Fig. 5 is a cross sectional view as on line 5—5, Fig. 4;

Fig. 6 is an enlarged fragmentary vertical sectional view, partly in elevation, of another embodiment of the invention;

Fig. 7 is a sectional view as on line 7—7, Fig. 6; and

Fig. 8 is a view similar to Fig. 6, showing the valve in open position.

Similar numerals refer to similar parts throughout the several views of the drawings.

While the novel flow regulator has a number of applications, it is particularly adapted for regulating the flow of water into a water closet flush tank for insuring efficient operation of the ball cock or valve controlling the flow of water into the tank. By way of example, I have shown the novel flow regulator applied to a ball cock assembly of the type disclosed in my copending application, Serial No. 618,504, filed September 25, 1945, and entitled Silent ball cock, but obviously it may be applied to other types without departing from the scope of the present invention.

Referring first to the embodiment of the invention shown in Figs. 1 to 5 inclusive, the ball cock assembly includes a vertical water inlet pipe or tube 10 secured at its lower end in a nut 11 formed on the upper end of a threaded connector 12 which extends through an opening in the bottom wall 13 of the flush tank. A suitable washer 14 of rubber or the like is interposed between the flange 15 of the nut 11 and the tank wall 13, and a clamping nut 16 may be screwed on the connector 12 for abutting the lower surface of the tank wall 13. The lower end of the connector 12 may be provided with a cap 17 during shipment and storage, and is connected with a water supply pipe in a usual manner when installed in the tank.

The upper end of the inlet tube 10 is secured in the boss 18 of a housing 19 and communicates with an inlet passage 20 around the upper end of which is an annular valve seat or shoulder 21. A diaphragm valve 22 of rubber or other flexible material is secured in the upper portion of the housing 19, and the valve 22 has a thickened central body portion 23 which is adapted to seat on the shoulder 21 and close the inlet passage 20.

The body portion 23 has a small conical aperture 24 extending therethrough with its large end uppermost, and this aperture permits a small amount of water to flow through the diaphragm valve 22 into the pressure chamber 25 formed by the bottom end of a pilot valve housing 26 which is screwed into the upper end of the housing 19. The outer rim of the diaphragm valve 22 is beveled as indicated at 27 and is engaged by a beveled surface on the bottom end of the pilot valve housing 26 to securely clamp the rim of the diaphragm valve. The under surface of the rim of the diaphragm valve is abutted by a metal plate 28 which is supported by an annular flange 29 formed in the housing wall.

A pilot valve 30 is mounted in the housing 26 for vertical reciprocating movement, and controls the discharge of water from the pressure chamber 25 into a refill line chamber 31 to the side of which a refill line pipe 32 is connected. The refill line pipe 32 conducts water to an overflow pipe and thence to the toilet bowl in a usual fashion.

The pilot valve 30 has a stem 33 which extends upwardly through the refill line chamber 31 and is connected above the housing 26 with a lever arm 34. The lever arm 34 is pivotally connected at one end to a link 35 on the upper end of housing 26 and is pivotally connected at its other end to a link 36 which is in turn pivoted to a yoke arm 37 attached to the float rod 38. The float rod 38 has the usual float (not shown) attached to its outer end for rising and falling with the water level in the flush tank.

Preferably, the pilot valve stem 33 is loosely connected by means of a clip 39 to a cross bar 40 in the lever 34, so that movement of the float rod 38 will open and close the pilot valve, the pilot valve 30 being in closed position when the float is raised as in Fig. 1, and being in open position when the float has dropped as in Fig. 4. As shown, a diaphragm partition 41 is attached to the valve stem 33 at the top of the refill line chamber 31, and its outer rim is clamped by a closure wire snap retaining ring 42 which is sprung into a retaining groove in the upper end of housing 26.

The pilot valve 30 moves up and down in a socket formed by four arcuate circumferentially spaced ribs 43, the spaces between ribs providing water passages around the valve head when it is in the open position of Fig. 4 so that water can flow past the valve seat 44 into the refill line chamber 31. Preferably, these ribs are counterbored to provide shoulders 45 for abutting the upper end of a helical spring 46 positioned in the socket formed by the ribs 43 and abutting the upper surface of the diaphragm valve 23 at its lower end. As shown, the upper surface of the diaphragm valve may have an annular rib 47 for centering the spring on the diaphragm valve.

In the operation of the ball cock, when the water in the tank has been discharged so that the float rod 38 drops to the position of Fig. 4, the pilot valve 30 is moved downwardly from its seat 44 to allow water to flow from the pressure chamber through the refill line 32 and this relieves the pressure on the upper side of the diaphragm valve 22. The pressure of the incoming water through the inlet tube 10 will then lift the body portion of the diaphragm against the spring 46 to the open position of Fig. 4 and the water entering through tube 10 can pass through the diaphragm valve to fill the flush tank. At the same time, a small portion of the incoming water flows through the conical aperture 24 and around the pilot valve to and through the refill line, to increase the depth of the water in the toilet bowl while the tank is filling.

When the water level in the tank has raised sufficiently to move the float rod upwardly and raise the pilot valve as the pilot valve approaches the closed position of Fig. 1, the water pressure on the bottom of the pilot will snap it shut and move the clip 39 a slight distance above cross bar 40, as shown. With the pilot closed, the flow of water through the conical aperture 24 immediately increases the water pressure on the upper side of diaphragm valve 12, and since the upper surface of the valve is much greater in area than the lower surface under pressure, the differential pressure on the upper side of the diaphragm valve will move it downwardly against the seat 21 and shut off the flow of incoming water.

The ball cock is normally non-siphoning because if a vacuum is created in the pressure chamber 25 and tube 10, atmospheric pressure on the top of the pilot valve will open it slightly until the clip 39 rests on the cross bar 40, which is sufficient to break the seal and destroy the vacuum. Also, the diaphragm valve body 23 is normally held against the seat 21 in closed position, by the tension of the rubber. As an additional safeguard, if for example the rubber valve 23 becomes set and shortens, spring 46 is provided. Thus, if the water supply in inlet tube 10 should suddenly be cut off when the tank is full of water and the valve in closed position, this would tend to create a vacuum in the tube 10 and in the pressure chamber 25. This vacuum would normally tend to lift the diaphragm valve off its seat due to the greater area of its upper surface, as a result of which the water from the tank would siphon back through the inlet pipe 10. However, with the spring 46 acting to maintain the valve 23 on its seat, the lifting effect of the vacuum under all such conditions is overcome.

This ball cock construction has been found in actual practice to operate very satisfactorily with substantially no noise or vibration, as long as the water supply line pressures do not vary over too wide a range. However, in order to insure quiet and efficient operation, the amount of water flowing through the valve should be maintained substantially constant. Since the ball cock assemblies have a standard construction for use in all parts of the world under conditions where the water supply may vary from a few pounds up to nearly two hundred pounds, it is desirable, if not necessary, to provide some means of automatically regulating the flow through the valve. As far as I am aware, no satisfactory regulating device has heretofore been provided for satisfactorily solving this problem.

The improved flow regulator of the present invention is preferably located in the water supply line, and may be ahead of the valve or behind the valve, the regulator shown in the drawings being located behind the valve. The regulator shown in Figs. 1, 3 and 4 preferably includes a cylindrical tube 48 secured at its upper end in the bottom of housing 19 and communicating with the outlet chamber 49 thereof through an aperture 50. The lower end of the cylindrical housing 48 is preferably closed by a cap 51 having outlet apertures 51 therein.

Within the cylindrical tube or housing 48 is a flow regulating element 53 which is made of rubber or rubber composition so as to be resilient and distortable. The exterior of the element 53 has a spiral or helical rib 54 formed thereon throughout its length and said helical rib abuts the walls of the housing 48 so as to form a spiral or helical groove or passageway 55 through which water flowing into the upper part of the housing 48 is conducted to the lower part of the housing 48, and thence out through the openings 52 into the tank. Preferably, the bottom end of the element 53 has a central projection 56 which is supported by the cap 51.

Preferably, the element 53 is provided with a bore 57 which is open at the upper or inlet end of the element, and which is closed or terminates adjacent the lower end of the element. The bore 57 is preferably tapered as shown in Fig. 1, from a larger diameter at its open upper end to a small diameter at its closed lower end.

When the water entering the inlet tube 10 flows past the valve 22 and into and through the housing 48, if the water is at low pressure, it will flow through a helical groove 55 at a sufficient rate so that the regulating element is maintained in a substantially normal condition as shown in Fig. 1, and under these conditions, the diaphragm valve 22 will operate noiselessly and efficiently.

When the pressure of the water in inlet tube 10 is materially increased so as to tend normally to cause vibration or chattering or noise in the valve, the pressure of the water entering the regulator housing 48 will compress the regulator element 53 longitudinally, and at the same time the pressure of the water in the bore 57 will distort or compress the walls of the helix radially, so as to greatly reduce the cross sectional area of the helical groove 55 in a manner such as indicated in Fig. 4. The result is that the rate of flow through the helical groove 55 is automatically reduced in proportion to the increased pressure, so that the amount of water passing over the valve is substantially the same as it was with the lower pressure, thus insuring the most efficient and quiet operation of the valve.

The purpose of tapering the bore 57 to a smaller cross sectional area at its closed end is to provide for reducing the area of the helical groove 55 by water pressure uniformly throughout its length. When the water pressure inside of the bore 57 is tending to force the walls of the helix 53 radially outward, such action is resisted to some extent by the pressure of the water flowing through the helical groove 55. The pressure of the water in the helical groove gradually becomes less as it approaches the lower end, due to the friction loss or pressure drop from the top to the bottom end of the groove. Consequently, the resistance to the radially outward pressure gradually becomes less, and therefore in order to keep the cross section of the helical groove 55 uniform, the area of the bore 57 is tapered so that the increasing wall thickness of the helix aids in resisting the radially outward pressure and the amount of reduction of the groove area is kept uniform.

Accordingly, in Fig. 4, the helix 53 is shown under the compression of relatively high water supply pressure, being compressed somewhat longitudinally, and the bore 57 being radially expanded so as to uniformly reduce the size of the helical groove 55 throughout its length. Thus, the amount of water flowing through the openings 52 into the tank is automatically regulated to be maintained substantially constant regardless of variations in supply pressure.

Referring to the embodiment of the invention shown in Figs. 6, 7 and 8, the portion of a ball cock assembly shown includes a supply tube 10a connected at its upper end to an inlet passage 20a in a housing 19a, a valve seat 21a being provided around the top of the inlet passage. A diaphragm valve 22a is mounted in the housing for seating on the valve seat 21a, and is clamped by the lower end of a pilot valve housing 26a, in which a pressure chamber 25a is formed.

When the valve 22a is open, the water from the supply tube 10a flows past the valve through the outlet port 50a, and thence through a central inlet port 59a into the inlet side of a flow regulator chamber formed by the cylindrical housing parts 60a and 61a, which may be screwed together as shown for assembly purposes. The housing part 61a has a central outlet port 62a which communicates with the down flow pipe 63a through which water discharges into the flush tank.

Within the flow regulator chamber formed by the housing parts 60a and 61a, a resilient distortable flow regulator disk or element 64a is located, and both opposite surfaces of the disk are provided with a spiral groove 65a which starts at the center of the disk and spirals outwardly to its outer edge. Adjacent the outer edge, the disk is provided with several ports 66a which extend through the disk and provide communication between the spiral grooves 65a at their outer portions. In the inlet side of the chamber, a flat metal plate or wall 67a is movably mounted, and the plate is normally spaced from the inlet side of the flow regulator chamber by an annular shoulder 68a in the housing part 60a. The plate 67a has a central opening 69a which registers with the inlet port 59a to the chamber and the outlet port 50a from the valve.

Thus, when the water under pressure flows over the valve and through port 59a, it will force the plate 67a to the right as viewed in Fig. 6 and compress the spiral ribs defining the spiral grooves 65a so as to reduce the cross sectional area of the spiral grooves, in a manner indicated in Fig. 8. The water entering the opening 69a will flow through the inlet side spiral groove 65a outwardly to the apertures 66a, then through the apertures and into the outlet side spiral groove 65a, and then spirally inward to the outlet port 62a and thence into the tank. Accordingly, as the supply pressure increases, the flow regulator disk 64a is compressed to automatically reduce the area of the spiral grooves 65a and thus automatically regulate the flow of water therethrough in proportion to the increased pressure. Accordingly, the flow of water through valve 22a is maintained substantially constant so as to insure the most quiet and efficient operation.

In the foregoing description, certain terms have been used for brevity, clearness and understanding; but no unnecessary limitations are to be implied therefrom beyond the requirements of the prior art, because such words are used for descriptive purposes herein and are intended to be broadly construed.

Thus, the term "spiral" is used herein in its general sense, and is intended to include both spiral and helical grooves and passageways.

Having now described the invention, the construction, the operation and use of preferred embodiments thereof, and the advantageous, new and useful results obtained thereby; the new and useful constructions, and reasonable mechanical equivalents thereof obvious to those skilled in the art are set forth in the appended claims.

I claim:

1. In a pressure fluid supply line, a flow regulator for maintaining the fluid flow substantially constant during variations in supply line pressure, said regulator including walls forming a chamber in said supply line, a resilient distortable element within and abutting said chamber walls, said element having an exterior spiral groove forming a spiral passageway adjacent to said chamber walls for conducting fluid through said chamber, and valve means for introducing fluid from the supply line into one end of said chamber so as to utilize the fluid pressure for distorting said element to vary the cross sectional area of the spiral passageway in proportion to variations in supply pressure.

2. In a pressure fluid supply line, a resilient distortable flow regulator element having a spiral passageway for conducting fluid from the supply line, and valve means for applying the pressure of fluid in the supply line axially of the distortable element to vary the cross sectional area of the spiral passageway in proportion to variations in supply pressure.

3. A device for regulating the flow of water to a flush tank and the like, including a housing, a supply line communicating with said housing, a resilient distortable element in said housing having an exterior spiral rib abutting said housing walls to form a spiral passageway adjacent to said walls, said passageway being adapted to conduct water from the supply line through the housing to the flush tank, and valve means for introducing water from said supply line into one end of said housing so as to utilize the water pressure for distorting said element to vary the cross sectional area of the spiral passageway in proportion to variations in supply pressure.

4. In a pressure fluid supply line, a flow regulator for maintaining the fluid flow substantially constant during variations in supply line pressure, said regulator including walls forming a cylindrical chamber in said supply line, a resilient distortable cylindrical element within and abutting said chamber walls, said element having an exterior helical groove in its cylindrical surface adjacent to said chamber walls for conducting fluid through said chamber, and means for introducing fluid from the supply line into said chamber axially of said element so as to utilize the fluid pressure for longitudinally compressing said element to vary the cross sectional area of the helical groove in proportion to variations in supply pressure.

5. In a pressure fluid supply line, a resilient distortable cylindrical element having a helical passageway in its cylindrical surface for conducting fluid from the supply line, and means for applying the pressure of fluid in the supply line axially of said element for longitudinally compressing the distortable element to vary the cross sectional area of the helical passageway in proportion to variations in supply pressure.

6. A device for regulating the flow of water to a flush tank and the like, including a cylindrical housing, a supply line communicating with said housing, a resilient distortable cylindrical element in said housing having an exterior helical rib abutting said housing walls to form a helical passageway adjacent to said walls, said passageway being adapted to conduct water from the supply line through said housing to the tank, said element having a longitudinal bore open at its inlet end and closed at its outlet end, and means for introducing water from said supply line into the inlet end of said housing for distorting said element to vary the cross sectional area of the helical passageway in proportion to variations in supply pressure.

7. A device for regulating the flow of water to a flush tank and the like, including a cylindrical housing, a supply line communicating with one end of said housing, a cylindrical resilient distortable element in said housing having an exterior helical rib abutting said housing walls to form a helical passageway adjacent thereto, said passageway being adapted to conduct water through said housing to the flush tank, said distortable element having a longitudinal bore open at its inlet end and closed at its outlet end, and said bore being tapered from its open inlet end to a smaller cross sectional area at its closed outlet end.

8. In a pressure fluid supply line, a flow regulator for maintaining the fluid flow substantially constant during variations in supply line pressure, said regulator including walls forming a chamber in said supply line, one of said chamber walls being movable, a resilient distortable element within and abutting said chamber walls, said element having an exterior spiral groove forming a spiral passageway adjacent to one of said chamber walls for conducting fluid through said chamber, and means for applying the pressure of the fluid in the supply line against said movable wall to distort said element and vary the cross sectional area of the spiral passageway in proportion to variations in supply pressure.

9. A device for regulating the flow of water to a flush tank and the like, including a housing, a supply line communicating with said housing one of said housing walls being movable, a resilient distortable element in said housing having an exterior spiral rib abutting one of said housing walls to form a spiral passageway adjacent thereto, said passageway being adapted to conduct water from the supply line through said housing to the tank, and means for applying the pressure of the water in the supply line to the movable housing wall to distort said element and vary the cross sectional area of the spiral passageway in proportion to variations in the water supply pressure.

RUTHERFORD H. HUNTER.

REFERENCES CITED

The following references are of record in the file of this patent:

UNITED STATES PATENTS

| Number | Name | Date |
| --- | --- | --- |
| 1,964,300 | Perry et al. | June 26, 1934 |
| 2,289,905 | Dasher | July 14, 1942 |